(12) United States Patent
Suh et al.

(10) Patent No.: US 9,527,931 B2
(45) Date of Patent: Dec. 27, 2016

(54) HYDROPHOBIC SELF-ETCH DENTAL ADHESIVE COMPOSITIONS

(75) Inventors: Byoung I. Suh, Oak Park, IL (US); Liang Chen, Schaumburg, IL (US)

(73) Assignee: Bisco, Inc., Schaumburg, IL (US)

( * ) Notice: Subject to any disclaimer, the term of this patent is extended or adjusted under 35 U.S.C. 154(b) by 0 days.

(21) Appl. No.: 13/385,379

(22) Filed: Feb. 16, 2012

(65) Prior Publication Data

US 2013/0217800 A1 Aug. 22, 2013

(51) Int. Cl.
*C08L 33/10* (2006.01)
*C08F 2/48* (2006.01)

(52) U.S. Cl.
CPC ...................... *C08F 2/48* (2013.01)

(58) Field of Classification Search
None
See application file for complete search history.

(56) References Cited

U.S. PATENT DOCUMENTS

| | | | |
|---|---|---|---|
| 5,733,949 A * | 3/1998 | Imazato et al. | 523/109 |
| 6,147,137 A | 11/2000 | Jia | |
| 6,458,868 B1 | 10/2002 | Okada et al. | |
| 6,512,068 B1 * | 1/2003 | Nakatsuka | 526/277 |
| 6,730,715 B2 | 5/2004 | Jia | |
| 6,750,268 B2 | 6/2004 | Hino | |
| 6,994,551 B2 * | 2/2006 | Wang et al. | 433/226 |
| 2002/0061938 A1 | 5/2002 | Hino | |
| 2003/0171450 A1 * | 9/2003 | Wang et al. | 523/115 |
| 2003/0186196 A1 * | 10/2003 | Wang et al. | 433/226 |
| 2004/0254261 A1 * | 12/2004 | Kojima et al. | 523/118 |
| 2005/0154081 A1 | 7/2005 | Yin et al. | |
| 2005/0175966 A1 * | 8/2005 | Falsafi et al. | 433/215 |
| 2005/0252414 A1 | 11/2005 | Craig et al. | |
| 2005/0277706 A1 | 12/2005 | Han et al. | |
| 2006/0270751 A1 | 11/2006 | Thalacker et al. | |
| 2008/0293846 A1 | 11/2008 | Craig et al. | |

FOREIGN PATENT DOCUMENTS

WO  WO2010110798  9/2010

OTHER PUBLICATIONS

S. Chersoni et al., "In Vivo Fluid Movement Through Dentin Adhesives in Endodontically Treated Teeth", J. Dent. Res. 84(3):223-227 (Mar. 2005).
R.M. Carvalho et al., "Adhesive Permeability Affects Coupling of Resin Cements That Utilise Self-Etching Primers to Dentine", J. Dent. 32(1):55-65 (Jan. 2004).
S. Chersoni et al., "Water Movements in the Hybrid Layer After Different Dentin Treatments", Dent. Mater. 20(9):796-803 (Nov. 2004).
S. Chersoni et al., "In Vivo and In Vitro Permeability of One-Step Self-Etch Adhesives", J. Dent. Res. 83(6):459-464 (Jun. 2004).
F.R. Tay et al., "Single-Bottle Adhesives Behave as Permeable Membranes After Polymerization I. In Vivo Evidence", J. Dent. 32(8):611-621 (Nov. 2004).
F.R. Tay et al., "Single-Step Adhesives Are Permeable Membranes", J. Dent. 30(7-8):371-382 (Nov. 2002).
B.I. Suh et al., "Factors Contributing to the Incompatibility Between Simplified-Step Adhesives and Chemically Cured or Dual Cured Composites Part III. Effect of Acidic Resin Monomers", J. Adhes. Dent. 5(4):267-282 (2003).
F.R. Tay et al., "Factors Contributing to the Incompatibility Between Simplified-Step Adhesives and Chemically Cured or Dual Cured Composites Part I. Single-Step Self-Etching Adhesive", J. Adhes. Dent. 5(1):27-40 (Mar. 2003).
Van Landuyt et al., "Systematic Review of the Chemical Composition of Contemporary Dental Adhesives", Biomaterials (Elsevier Ltd.), 28:3757-3785 (May 7, 2007).

* cited by examiner

*Primary Examiner* — Peter A Salamon
(74) *Attorney, Agent, or Firm* — Ice Miller LLP

(57) ABSTRACT

A hydrophobic self-etch dental adhesive composition including a hydrophobic, surfactant-type acidic monomer. The composition may further include hydrophilic and hydrophobic monomers, preferably in a ratio of less than 1:1, and may include a solvent that is an azeotrope.

26 Claims, 1 Drawing Sheet

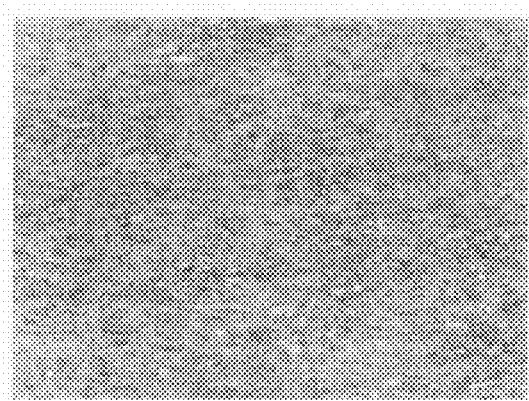
H-SEA (0 min)
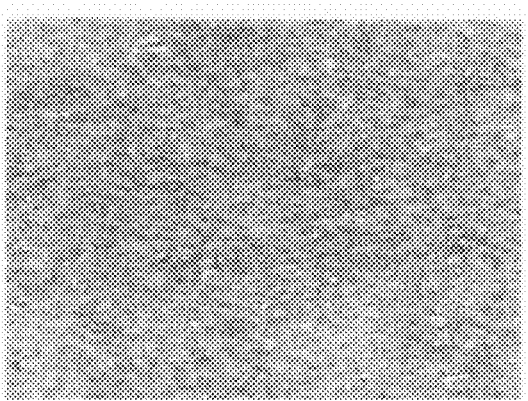
H-SEA (5 min)
OptiBond (0 min)
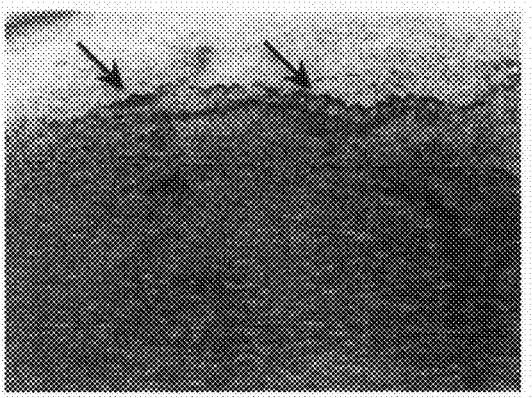
OptiBond (5 min)
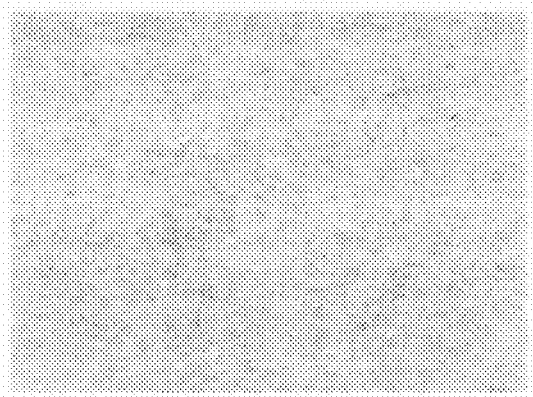
Xeno IV (0 min)
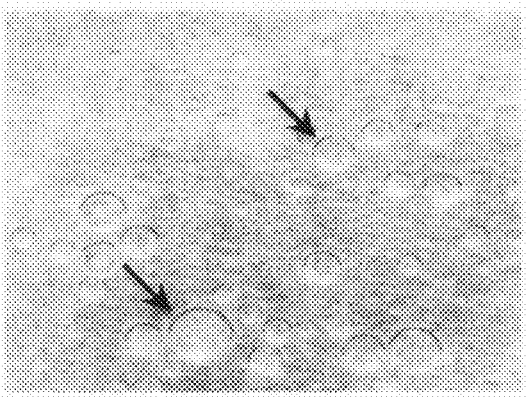
Xeno IV (5 min)

HYDROPHOBIC SELF-ETCH DENTAL ADHESIVE COMPOSITIONS

BACKGROUND OF THE INVENTION

The present invention relates to dental adhesives and, in particular, to hydrophobic compositions for self-etch dental adhesives.

Advances in dental restorative techniques include the use of various materials such as composite resins to effect tooth filling or other restorative processes. Other advances include the use of dental components such as thin wire braces and other types of dental components made of metal, ceramics, resins or other bio-compatible substances. Depending on the clinical application, such restoratives and components may be applied directly to the tooth dentin and/or enamel, or may be applied to other bio-compatible substrates such as metals, ceramics, resins, amalgams, or other restorative materials which may already exist in the patient and/or are to be added as part of the clinical treatment.

Common to the foregoing materials and techniques is the need for bonding systems to enhance the bonding of the restorative or other dental component to the chosen dental substrate. Ideally, such enhancement would provide bond strengths which approach the strength of the underlying substrates. In addition, ideal bonding systems would also be simple for the dental professional to use in a manner which requires a minimum of time for the patient in the chair.

Several bonding systems and techniques have been reported in the literature which have achieved some, but not all of the above-stated goals. Such bonding systems can be divided into three general categories, multiple-component primer systems, two component primer systems, and single-component primer systems.

A. Multiple Component Bonding Systems

A general discussion of multiple-component bonding systems and their predecessors is set out in Suh, "All-Bond—Fourth Generation Dentin Bonding System," J. Esthetic Dentistry, Vol. 3, No. 4, pp. 139-147 (July-August, 1991) and in Bowen U.S. Pat. No. 5,270,351 at Col. 1, lines 29-Col. 2, line 36 and Col. 2, lines 54-64, the disclosures of which are hereby incorporated by reference. Briefly summarized, the early generation bonding systems generally disclosed at Col. 1 and 2 of the '351 patent began with simple pretreatment of the dental substrate with mordants and/or acidic solutions before application of the dental restorative or component. Such systems, while simple to use, did not provide high bond strengths on substrates such as tooth dentin.

Those low bond strengths led to the development of the multiple-component bonding systems discussed at Col. 2 of the '351 patent and discussed in detail in the J. Esthetic Dentistry article at pp. 139-147. Such systems generally employed the older generation system's first step of pretreatment of tooth dentin or enamel with acidic solutions to decalcify and remove dentin smear layer and to etch tooth enamel (a technique often referred to as "total etch" process, as both dentin and enamel may be etched using a low pH solution). The multi-component systems then employed two or more separate "primer" or "adhesive enhancing" compounds to further enhance bonding between the substrate and the dental restorative. However, the primers in such systems must either (1) be applied separately and sequentially to the dental substrate, or (2) must be mixed together by the dental professional in the office immediately before use on the patient to prevent premature polymerization of the components.

The first type of such multiple-component primer systems is exemplified in Bowen U.S. Pat. Nos. 4,514,527, 4,551, 550, 4,558,756 and 4,659,751, and Ibsen et al. U.S. Pat. No. 4,964,911 (and related Ibsen et al. U.S. Pat. No. RE34937) discussed at Col. 2 of the '351 patent. Those earlier patents disclose, inter alia, two or three component primer systems employing the separate steps of treating the dental substrate with (1) an acidic acid solution of inorganic acids, polycarboxylic acids and metal salts of such acids capable of changing valence states, (2) applying a first primer compound comprising N-arylglycine and derivatives such as NTG-GMA (the adduct of N(p-tolyl)glycine and glycidyl methacrylate), NPG (N-phenylglycine), and other amino acids and metal salts thereof to the substrate, followed by (3) applying a second polymerizable adhesive bonding monomer to the substrate comprising PMDM, BDTA-HEMA, 4-META, or other polymerizable acidic monomers disclosed therein and having groups or moieties that do not interfere with polymerization. Although some of those systems report achieving moderate bond strengths for bonding to substrates such as tooth dentin, from about 1600 to about 2500 psi (11-17 Mega Pascals (1 MPa=145 psi)), such multi-component/multi-step methods are necessarily complicated for the dental professional and time-consuming for the patient.

B. Two-Component Primer Systems

As an alternative to multiple-component primer systems, Bowen and others, including applicant's assignee, Bisco, Inc., have reported development of two-component primer systems. See, e.g., Bowen U.S. Pat. Nos. 5,320,886 and 5,270,351, Suh et al. article cited above and U.S. Pat. No. 5,348,988 and Bunker U.S. Pat. No. 4,544,467. Such systems involve steps whereby the dental professional admixes the two primer components immediately prior to application of the mixture to the dental substrate. Immediate application is required in such systems because the primer composition begins to polymerize upon mixing due to the chemical nature of the primer molecules, at least one of which contains ethylenically unsaturated (vinyl) groups whose polymerization is initiated by the tertiary amine group present on the other primer component of the system. The two-component primer bonding systems typically require an acid-etch step to provide a secure bond between the dentin and/or enamel and the primer, resulting in the so-called "hybrid layer" wherein the dentin/enamel and primer interface with one another.

A different type of a two-component primer bonding system is disclosed in Waknine U.S. Pat. No. 5,276,068. That two-component system comprises a polymerization initiator and a polymerizable compound which are packaged separately. The first step in that system requires application of polymerization initiator alone to the dental substrate. In a second step, the polymerizable compound is applied to the substrate. Polymerization begins when the polymerizable compound comes into contact with the initiator on the substrate surface.

Some of the aforesaid multiple-component primer systems were reported as providing only moderate dentin adhesive bonding strengths. For example, the data included in the Bowen '351 and '886 patents show dentin adhesive bond strengths of from about 10 to about 15 MPa. Moreover, the higher bond strengths reported in the '351 patent were achieved only after an additional step and component, comprising applying an unfilled adhesive resin monomer to the primed substrate before application of the dental restorative composite material, was added to the restorative process. (See '351 patent, Example 1.) The Waknine '068 patent also reports relatively low bond strengths in the 10 MPa range and also used an additional step of application of a commercial bonding resin (see Examples 22-23). Bunker et al. reported slightly lower dentin shear bond strengths of between about 5 MPa and 8 MPa (49.3 to 86.5 kg/cm$^2$).

Surprisingly, Suh et al.'s two-component primer system utilizing polymerizable acidic monomer biphenyl dimethacrylate (BPDM) achieved bond strengths of between 22 and 27 MPa for dentin bonding, which approaches or equals the point of cohesive failure of tooth dentin. High bond strengths of around 23-26 MPa were also achieved with that two component priming system for bonding to tooth enamel. (See, e.g., J. Esthetic Dentistry article, "Hydrophilic Primer Adhesive System and Optional Hydrophobic Resin").

C. Single Component Primer Systems

Additionally, there have been reported certain "one-component" or "single step" dental bonding systems. See, for example, Blackwell et al. U.S. Pat. Nos. 4,657,941 and 4,816,495 and Huang et al. U.S. Pat. No. 4,966,934 all of which are assigned to Dentsply Research and Development Corporation (hereinafter also collectively referred to as the Dentsply patents) and Bunker U.S. Pat. No. 5,304,585.

The Bunker et al. system is reported as involving polymerizable phosphoric acid ester adhesives. Such compositions are generally disclosed therein as capable of being packaged with polymerization initiators in the presence of polymerization inhibitors and other compounds in one package. (See '585 patent, col. 10, line 31 to col. 11, line 8.) However, such one-component packaging is not exemplified in the '585 patent. Instead, a two-component was tested in Example 1 of that patent, involving admixing of the polymerization initiator sodium benzenesulfinate first component with the phosphorous ester monomer second component immediately before application to the tooth substrate. Bunker et al. also reported relatively low bond strength to dentin of around 9 MPa. (See '585 patent, col. 12, lines 16-42.)

The Dentsply patents also disclose alleged one-component dentin and enamel bonding primer and adhesive systems. Such systems are reported as based inter alia on phosphorous-containing adhesion promoter compounds. However, the phosphorous-based bonding systems disclosed in the examples of '941 and '495 patents all gave relatively low bond strengths of 8.39 MPa or less.

The dipentaerythritol pentaacrylate phosphoric acid ester-based (PENTA) bonding systems disclosed in the '934 patent were reported as generating higher dentin bond strengths in the range of 10-27 MPa. (See '934 patent Example 10.) However, also reported therein is data showing that the higher reported bond strength systems were not stable over time, with the 27 MPa strength system reported as decreasing to around 10 MPa or less after 1-2 weeks storage of the system at elevated temperatures. (See '934 patent, Table VIII.) Moreover, the higher bond strengths reported in the '934 patent were in actuality two-component systems in which a second commercial, unfilled adhesive bonding resin component was used after application of the phosphorous primer composition. (See Example 4 and Example 10 at Col. 17, line 60-Col. 18, line 53 and Tables IX and X.) The "most promising" PENTA-based bonding systems disclosed in the '934 patent were further tested with that additional second adhesive component and step which were reported to provide bonding strengths from about 17 to 20 MPa. (See Table X.) In all three Dentsply patents, the primer curing system was reported as light-curing done after either application of the composite resin material and/or after application of a separate adhesive resin. (See Example 4 of '941, '495 and '934 patents.)

U.S. Pat. No. 4,525,256 discloses certain one component photopolymerizable resins containing certain tertiary amine accelerators. However, such compositions are composite (filled) resins, and not dental primer or adhesive compositions. (See '256 patent, Examples 1-3.) U.S. Pat. No. 5,295,824 discloses inter alia plastic orthodontic devices with a "shelf-stable" monomeric adhesive layer pre-coated and "solvated" into the plastic device. The bond strengths reported therein are about 10-20 kg, which if meant to be kg/cm$^2$, translate to rather low levels of around 2-4 MPa.

PCT application publication No. WO/93/02630 discloses an adhesive-coated orthodontic bracket. The bracket's adhesive layer comprises ethoxylated diglycidylmethacrylate of Bisphenol A (Bis-GMA), Bis-GMA and/or other monomers and photo-initiator catalysts and inhibitors. The bond strength of such pre-coated brackets were reported to be in the range of 54-104 kg/cm$^2$ (about 5-10 MPa).

D. Bond Strength and Etching Systems

In general, the three-step process of etching/rinsing, applying a primer(s), followed by an adhesive, and thereafter followed by a restorative resin has been reported in the literature as the "gold standard" of achieving high bond stability and durability in a dental restoration bonded to dentin. De Munck et al., J. Dent. Res. 84(2):118-124 (2005). However, three step process restorations are reported to be more labor intensive and technique sensitive, and the technique used can significantly influence the resultant bond strength. Id. Nonetheless, reported laboratory results show that three-step etch and rinse systems provide in an average initial dentin microtensile bond strength ($\mu$TBS) that is higher than that reported for acid-etched and self-etched two-step adhesive systems. Id. Self-etched single component systems were reported to have the lowest initial microtensile bond strengths. Id.

Commercially available single-component self-etching bonding systems are reported as being promoted for use primarily for ease of use and low technique sensitivity, as well as good performance in class V clinical trials. Inoue et al. J. Dent. Res 84(12):1160-1164 (2005). However, aside from the relatively low initial dentin and enamel bond strength, self-etch single-component systems employing functional acidic methacrylate monomers with water that are stored together in a single bottle have been reported to degrade via hydrolysis during storage. Nishiyama et al., J. Dent. Res. 85(5):422-426 (2006) (describing such simplified self-etch adhesives as having "poor shelf lives"). Further, such degradation has been reported to occur as early as one month from the date of manufacture when kept at 25° C. Id.

E. Bond Strength and Hydrophilicity

Apart from initial bond strength, recent studies have tested the bond strength of various resins when exposed to conditions approximating those experienced in vivo over time. In particular, it has been reported that resins formed from relatively hydrophilic monomers results in a substantially weaker bond strength after cured, largely due to hydrolysis, elution, and the formation of water trees within the hybrid layer. Yiu C K, Biomaterials (25):5789-5796 (2004). Those, studies report that the greatest absorption of water in hydrophilic compounds occurs within the first day of exposure to water. Id. In addition, hydrophilic acidic resins were reported to show the greatest decrease in bonding strength within the first month of exposure to water. Id. Recent studies suggest that some commercial single-step dental bonding systems are hydrophilic and have their greatest water-sorption during the first few weeks of storage in water. Malacarne J. Dental Materials 22:973-980 (2006).

Thus it would be desirable to provide a one-step, self-etch adhesive that has reduced permeability and improved bond strength.

SUMMARY OF THE INVENTION

Hydrophobic dental adhesive compositions are disclosed, comprising a hydrophobic, surfactant-type acidic monomer, a hydrophobic monomer, a hydrophilic monomer, and a solvent. In an alternative embodiment, the hydrophobic, surfactant-type acidic monomer is a methacryloxyloxyalkyl dihydrogen phosphate and, preferably, a methacryloxyloxyalkyl dihydrogen phosphate having an alkyl carbon chain of 10-18 carbon atoms. In yet another embodiment, the solvent is an azeotrope and, preferably, comprises ethanol and water in a ratio of about 22:1 ethanol to water.

BRIEF DESCRIPTION OF THE DRAWINGS

FIG. 1 is a series of photographic images showing the phase separation during evaporation of a hydrophobic self-etch adhesive composition and the conventional commercially available adhesives Xeno® IV and OptiBond® All-In-One.

DETAILED DESCRIPTION OF THE INVENTION

Conventional one-component, self-etch adhesives typically have hydrophilic compositions that comprise an aqueous mixture of hydrophilic and hydrophobic monomers and solvents. Sufficient solvents are added to create a single-phase solution of the hydrophilic and hydrophobic components. Low-molecular weight hydrophilic monomers such as 2-hydroxyethyl methacrylate (HEMA) are commonly incorporated in adhesive compositions and act as co-solvents that minimize phase separation.

A hydrophilic composition is thought to be required to promote infiltration and bonding of the adhesive to the dentin. Thus, the bond strength of the adhesive typically decreases as the hydrophobicity increases. However, as described above, such hydrophilic adhesive compositions have also been found to be permeable and water-sorptive even after curing, which may cause patient sensitivity and accelerate hydrolysis and bond degradation. Furthermore, such adhesive compositions have been observed to undergo phase separation of the hydrophobic components in the form of microscopic "droplets" which form during evaporation of the solvent. These droplets may reflect the nonhomogeneous polymerization of the hydrophilic and hydrophobic monomers, which may cause the formation of voids and/or water trees and make the cured adhesive permeable to water. The droplet residue may also affect the polymerization and curing of the adhesive, interfere with the adherence of the restorative resin to the adhesive, and cause debonding of the restorative material.

In addition, self-etch adhesives have been found have reduced bond strength when used with self-cure and dual-cure restorative resins. Self-etch adhesives generally comprise acidic monomers that serve to etch the dentin surface and promote bonding. However, the cured adhesives may have a residual low pH that can interfere with the activity of tertiary amines in self-cure and dual-cure resin compositions that are used to promote polymerization. As a result, polymerization of the resin at the interface with the adhesive may be inhibited and debonding of the restorative material may occur.

A one-component, hydrophobic self-etch dental adhesive composition is described that has reduced water-sorption and permeability, and has improved compatibility with self-cure and dual-cure resins. In addition, the composition has reduced phase separation during evaporation of solvents.

The hydrophobicity of the self-etch adhesive composition system is achieved through the use of a hydrophobic, surfactant-type acidic monomer, in addition to a hydrophilic monomer, a hydrophobic monomer. The hydrophobicity of the composition is further ensured by reducing or minimizing the relative amount of the hydrophilic monomer and increasing or maximizing the relative amount of the hydrophobic monomer. Conventional adhesives commonly contain a ratio of hydrophilic to hydrophobic monomers of 1:1 to 1.5:1. In contrast, the hydrophobic self-etch adhesive composition preferably comprises a ratio of hydrophilic to hydrophobic monomers that is less than 1:1, and more preferably less than about 1:2. In a particularly preferred embodiment, the hydrophobic self-etch adhesive compositions comprises between about 3-20 wt % of the hydrophobic, surfactant-type acidic monomer, between about 5-15 wt % of the hydrophilic monomer, and at least about 30 wt % of the hydrophobic monomer.

Suitable hydrophobic, surfactant-type acidic monomers generally comprise compounds having long carbon chains and phosphoric acid and/or carboxylic acid groups. In a preferred embodiment, the hydrophobic, surfactant-type acidic monomer is an acrylate or methacrylate, such as methacryloxyloxyalkyl dihydrogen phosphate, and more preferably a methacryloxyloxyalkyl dihydrogen phosphate having an alkyl carbon chain of 10-18 carbon atoms (n=10 to n=18). In a particularly preferred embodiment, the hydrophobic acidic monomer is 10-methacryloyloxydecyl dihydrogen phosphate (MDP) having a carbon chain of n=10. Carbon chains where n>18 are increasingly hydrophobic and are also expected to be suitable for use in hydrophobic adhesive compositions. Carbon chains where n<10 may also be useful, although the hydrophobicity is reduced and the monomer likely becomes hydrophilic where n=2.

Suitable hydrophilic monomers include HEMA, methacrylic acid, methylmethacrylate, hydroxylpropyl methacrylate, and other hydrophilic monomers known in the art. In a preferred embodiment, the hydrophilic monomer is HEMA.

Suitable hydrophobic monomers include bisphenol A glycidylmethacrylate (BisGMA), urethane dimethacrylate (UDMA), ethoxylated bisphenol A glycol dimethacrylate (BisEMA), 1,6-hexanediol dimethacrylate, and other hydrophobic monomers known in the art. In a preferred embodiment, the hydrophobic monomer is a hydrophobic dimethacrylate, and more particularly, BisGMA.

The hydrophobic adhesive composition also includes one or more solvents, as are known in the art, including water and/or ethanol. In a preferred embodiment, the solvent comprises between about 15-50 wt % of ethanol and between about 0.5-10 wt % of water, more preferably with a ratio of ethanol:water in a range of between about 10:1 to about 30:1, and most preferably with a ratio of between about 20:1 to about 30:1.

In a particularly preferred embodiment, the solvent is an azeotrope—i.e. a mixture of two or more liquids in such a ratio that its composition cannot be changed by simple distillation. It has been found that the use of an azeotropic solvent facilitates evaporation, reduces phase separation and the formation of droplets and, therefore, is believed to improve bond strength and durability of the adhesive. Suitable azeotropes include azeotropic mixtures of water/ethanol, water/isopropanol, water acetonitrile and water/ethyl acetate.

The solvent is most preferably an azeotrope of ethanol and water. Not only does the azeotrope have a lower boiling point than either water and ethanol, the water and ethanol will be evaporated together. This means that there would be no water residue after ethanol was evaporated, and consequently, no phase separation. The azeotrope of ethanol and water is well known and comprises about 95.63 wt % of ethanol and 4.37 wt % of water. Thus, in a preferred embodiment, the solvent comprises ethanol and water in a ratio of about 22:1.

The hydrophobic adhesive composition may also include polymerization initiators and/or activators, as are known in the art. In a preferred embodiment, the hydrophobic adhesive composition comprises between about 0.1-2 wt % of a polymerization initiator, and between about 0.2-4 wt % of a polymerization activator. Suitable polymerization initiators include photoinitiators, such as camphorquinone (CQ). Suitable polymerization activators include tertiary amines, such as ethyl-4-dimethylaminobenzoate (EDMAB).

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

Hydrophobic Self-Etch Adhesive Composition

A hydrophobic self-etch adhesive ("H-SEA") composition was prepared as shown in Table 1. The methacryloxyloxydecyl dihydrogen phosphate (MDP) was obtained from PCM Products GmBH (Krefeld, Germany). The solvents are present in an approximately azeotropic ratio of 4.3% water and 95.7% ethanol.

TABLE 1

| | |
|---|---|
| BisGMA | 37.5 (wt %) |
| HEMA | 14 (wt %) |
| MDP | 9 (wt %) |
| CQ | 0.4 (wt %) |
| EDMAB | 1.5 (wt %) |
| Ethanol | 36 (wt %) |
| Water | 1.6 (wt %) |

EXAMPLE 2

Treatment of Dentin Substrates

Extracted human teeth were embedded in resin discs, abraded on the facial surface with a model trimmer, and then polished with wet 320 grit SiC paper to create a flat and smooth dentin substrate for bonding. The polished dentin surfaces were rinsed with water and blotted dry.

The prepared dentin substrates were treated with the H-SEA composition of Example 1. One or two coats of the H-SEA composition were applied to the polished dentin surface using a micro-brush. The amount of the H-SEA composition applied was sufficient to cover the surface. The applied H-SEA composition was subsequently air dried and then light-cured for 10 seconds at 500 mW/cm$^2$ using a VIP Junior Dental Curing Light (Bisco, Inc.—Schaumburg, Ill.) having a wavelength of 400-500 nm.

For comparison, prepared dentin substrates were also treated with conventional, commercially available self-etch dental adhesives: Ace All-Bond SE® (Bisco, Inc.—Schaumburg, Ill.), Multilink® Primer A/B (Ivoclar Vivadent Inc.—Amherst, N.Y.), OptiBond® All-In-One (Kerr Corp.—Orange, Calif.), G-ænial Bond (GC America Inc.—Alsip, Ill.), or Adper® Easy Bond (3M ESPE—St. Paul, Minn.). Treatment of the prepared dentin samples was carried out according to the respective manufacturer's instructions and the adhesives were fully cured.

EXAMPLE 3

Hydrophobicity And Bond Strength

Cured adhesive samples were prepared by applying one or two coats of the H-SEA composition to the surface of a glass slide. The adhesive was covered with a plastic cover slip to prevent the formation of an oxygen inhibited layer, and then fully light-cured for 40 seconds at 500 mW/cm$^2$ using a VIP Junior Dental Curing Light. For comparison, cured adhesive samples were also prepared using the commercially available adhesives: Ace All-Bond SE®, Multilink® Primer A/B, OptiBond® All-In-One, G-ænial Bond or Adper® Easy Bond.

The cover slip was removed from the sample and a de-ionized water droplet was applied to the surface of the cured adhesive. The hydrophobicity of the cured adhesive was determined by measuring the contact angle of the water droplet using an NRL Contact Angle Goniometer Model 100-00-115 (Rame-Hart Inc.—Mountain Lakes, N.J.), according to the manufacturer's instructions. Ten cured adhesive samples were measured for each of the H-SEA composition, Ace All-Bond SE®, OptiBond® All-In-One, G-æenial Bond and Adper® Easy Bond, and the mean (standard deviation) values shown in Table 2.

Shear bond strength was tested using the Ultradent jig method and performed as generally described in Pashley et al., Dental Materials 11:117-125 (1995). Test samples were prepared by applying Duo-Link resin cement (Bisco, Inc.—Shaumburg, Ill.) to the treated dentin substrate using an Ultradent shear bond test device with a Teflon mold (Ultradent Products, Inc.—South Jordan, Utah) with a bonding area 4.5 mm$^2$, and light-cured for 40 seconds at 500 mW/cm$^2$ using a VIP Junior Dental Curing Light.

The cured test samples were stored in de-ionized water for 96 hours at 80° C. to simulate aging, or for 24 hours at 37° C. as a control. Shear bond strength was determined as the force required to debond the Duo-Link resin from the treated dentin substrate measured using an INstron Universal Testing Machine Model 4466 (Instron—Canton, Mass.) with a crosshead speed of 1 mm/min. Eight test samples were measured for each of the H-SEA composition, Ace All-Bond SE®, Multilink® Primer A/B, OptiBond® All-In-One, G-ænial Bond and Adper® Easy Bond, and the mean (standard deviation) values are shown in Table 2.

The hydrophobicity and shear bond strength data were analyzed statistically by one-way ANOVA and Tukey Tests ($p<0.05$). Mean values that are statistically different ($p<0.05$) are indicated in Table 2 using different letters (a, b, c). The quantitative relationship between decrease in shear bond strength after aging and the contact angle was analyzed by regression analysis (df=4) performed using Microsoft Excel software at confidence level 95%, and showed that the p-value is 0.016 (<0.05), and R-square is 0.89.

TABLE 2

| | Shear Bond Strength (MPa) | | | |
|---|---|---|---|---|
| | 37° C./ 24 hrs | 80° C./ 96 hrs | Δ Bond Str. | Contact Angle |
| Ace All-Bond SE ® | 28.4 (7.0)$^{ab}$ | 18.3 (8.9)$^{ab}$ | 35.5% | 56.7 (6.5)$^{b}$ |
| Multilink ® PrimerA/B | 22.7 (5.1)$^{b}$ | 14.0 (5.4)$^{b}$ | 38.3% | — |
| Optibond ® All-In-One | 29.1 (9.5)$^{ab}$ | 6.3 (2.0)$^{c}$ | 78.3% | 46.4 (2.9)$^{c}$ |
| G-ænial Bond | 12.0 (2.9)$^{c}$ | 6.3 (2.5)$^{c}$ | 52.5% | 55.4 (4.5)$^{b}$ |
| Adper ® Easy Bond | 33.7 (5.3)$^{a}$ | 18.0 (3.8)$^{ab}$ | 46.6% | 58.8 (4.6)$^{ab}$ |
| H-SEA | 31.0 (3.0)$^{a}$ | 22.4 (4.5)$^{a}$ | 27.7% | 62.2 (2.8)$^{a}$ |

As shown in Table 2, the H-SEA treated dentin substrate was found to have the highest degree of hydrophobicity (highest contact angle) of any of the self-etch adhesives tested without sacrificing bond strength, and provided substantially improved bond strength durability (lowest percentage bond strength decrease) over the commercially available dental adhesives tested. The percentage decrease in bond strength exhibits a linear relationship to hydrophobicity (contact angle values, R-square=0.89).

EXAMPLE 3

Water Resistance

The ability of the H-SEA composition to act as a barrier to water and seal the dentin surface was tested using calcium-releasing discs prepared from TheraCal LC® (Bisco, Inc.—Schaumburg, Ill.), a resin-modified calcium silicate that is designed to release calcium ions in aqueous environments. The calcium-releasing discs were prepared using a round stainless steel mold having an inner diameter of 20 mm and a height of 10 mm. The molds were filled with TheraCal, covered with a polyethylene cover slip, and then light-cured for 100 seconds at 500 mW/cm$^2$ using a VIP Junior Dental Curing Light. The cured TheraCal discs were coated with the H-SEA composition prepared as in Example 1, the solvent evaporated, and then light-cured for 40 seconds at 500 mW/cm2 using a VIP Junior Dental Curing Light. For comparison, TheraCal discs were also coated with the commercially available adhesives: One-Step, All-Bond 3®, or All-Bond SE (all from Bisco, Inc.—Schaumburg, Ill.). Uncoated discs were used as a control.

The discs were stored in 20 ml of de-ionized water at 37° C. for 24 hours. Calcium release (leaking out) from the TheraCal discs into solution was measured with a pH/ISE meter with a Calcium Ion Selective Electrode Model 9720BNWP (Thermo-Scientific Orion—Beverly, Mass.). Five test samples were measured for each of the H-SEA composition, One-Step®, All-Bond 3®, All-Bond SE® and control, and the mean (standard deviation) values are shown in Table 3.

The data were analyzed statistically by one-way ANOVA and Tukey Tests (p<0.05). Mean values that are statistically different (p<0.05) are indicated in Table 3 using different letters (a, b, c, d).

TABLE 3

| | Calcium Release (μg/cm$^2$) | % of Control |
|---|---|---|
| Control | 284.2 (0.0)$^{d}$ | 100.0% |
| One-Step ® | 79.6 (23.8)$^{c}$ | 28.0% |
| All-Bond 3 ® | 31.2 (15.5)$^{b}$ | 11.0% |
| All-Bond SE ® | 44.9 (16.4)$^{b}$ | 15.8% |
| H-SEA | 5.7 (2.0)$^{a}$ | 2.0% |

As shown in Table 3, the H-SEA composition exhibits substantially improved sealing properties in comparison to conventional adhesives. Although all of the adhesives tested provided some reduction in calcium release, the H-SEA composition acted as a virtually complete water barrier with a 98% reduction in calcium ion release, indicating that the H-SEA composition provides almost perfect sealing ability in oral environments (i.e. 37° C. water).

EXAMPLE 4

Compatibility with Self-Cure Materials

The ability of the H-SEA composition to serve as an adhesive for self-cure resin cements was tested using the self-etch and total-etch techniques.

Dentin substrates were prepared as described in Example 2, except that the polished dentin substrates were either rinsed with water (self-etch technique), or were etched with a solution of 37% $H_3PO_4$ for 15 seconds and then rinsed with water (total-etch technique). The prepared dentin substrates were then treated with the H-SEA composition as described in Example 2. As a control, phosphoric acid etched dentin substrates were treated with One-Step® adhesive (Bisco, Inc.—Schaumburg, Ill.) and light-cured, according to manufacturer's instructions.

Shear bond strength was tested using the Ultradent jig method as described in Example 3, except that the Duo-Link (dual-cure) resin cement was either light-cured for 40 seconds at 500 mW/cm$^2$, or self-cured for 15 minutes in the dark at 37° C. All test samples were stored in de-ionized water for 24 hours at 37° C. Shear bond strength was measured using an Instron Universal Testing Machine as described in Example 3. Eight test samples were measured for the control and for each of the H-SEA composition using either the self-etch or total-etch techniques, and light-cure or self-cure, and the mean (standard deviation) values are shown in Table 4.

The data were analyzed statistically by one-way ANOVA and Tukey Tests (p<0.05). Mean values that are statistically different (p<0.05) are indicated in Table 4 using different letters (a).

TABLE 4

| | Cure Mode | Shear Bond Strength (MPa) |
|---|---|---|
| One-Step ® (Control) | Light-Cure | 33.2 (6.8)$^{a}$ |
| H-SEA (Self-Etch) | Light-Cure | 31.0 (3.0)$^{a}$ |
| | Self-Cure | 29.4 (4.7)$^{a}$ |
| H-SEA (Total-Etch) | Light-Cure | 33.2 (7.8)$^{a}$ |
| | Self-Cure | 33.7 (5.6)$^{a}$ |

As shown in Table 4, there was no statistically significant difference in bond strength between the H-SEA composition and the control, using either the self-etch or total etch techniques, or with light-cure or self-cure. Thus, the H-SEA composition is fully compatible with self-cured resin materials.

EXAMPLE 5

Evaporation and Phase Separation

Evaporation test samples were prepared by applying one drop of the H-SEA composition (Example 1) to the surface of a flat glass slide. The solvent was allowed to evaporate undisturbed at room temperature. The evaporation of the solvent was analyzed by time lapse video using a Sony TechnoLook (TW-TL10M) video microscope at 100× magnification. For comparison, evaporation test samples were also prepared and analyzed using the commercially available conventional adhesives: Xeno® IV (Dentsply Int'l—Ontario, Canada) or OptiBond® All-In-One.

Referring to FIG. 1, pictures were taken after the initial application of the adhesives (0 min) and after 5 minutes (5 min) to determine if there were any signs of phase separation during evaporation. After 5 minutes, separation of the insoluble organic resins from the water phase during evaporation was readily observed for samples coated with Xeno® IV and OptiBond® All-In-One, as indicated by the arrows. In contrast, no phase separation was observed for samples coated with the H-SEA composition, which comprises an azeotropic solvent of water and ethanol.

EXAMPLE 6

Water Absorption

Water-sorption and solubility tests were performed according to the methods described in ADA Specification No. 27 for resin-based materials. Sample resin discs were prepared using a mold having an inner diameter of 10 mm and height of 0.5 mm. The mold was filled with the H-SEA composition (Example 1) without the solvent, to simulate clinical situations, and sandwiched between two glass slides covered with polyethylene film. The H-SEA composition was light-cured for 100 seconds on each side of the mold at 500 mW/cm$^2$ using a VIP Junior Dental Curing Light. For comparison, sample discs were also prepared from the commercially available conventional adhesives One-Step®, All-Bond 3® or All-Bond SE®, also excluding the solvent.

The sample discs were placed in a desiccator and weighed to an accuracy of 0.1 mg until a constant mass (m1) was obtained (i.e. until a mass difference of not more than 0.1 mg). The sample discs were then stored in de-ionized water for 7 days at 37° C. (±1° C.). After 7 days, the discs were removed, rinsed with water, blotted until free of visible surface water, waved in the air for 15 seconds, and then weighed (m2). After weighing, the hydrated sample discs were again placed in a desiccator and weighed until a constant mass (m3) was obtained. The diameter and thickness of the sample disc was measured and the volume (V) was calculated (mm$^3$). The values of water-sorption (Wsp) and solubility were calculated as follows:

$$Wsp=(m2-m3)/V$$

$$Wsl=(m1-m3)/V$$

Five sample discs were tested for each of the H-SEA composition, One-Step®, All-Bond 3® and All-Bond SE®, and the mean (standard deviation) values shown in Table 5.

TABLE 5

| | Water Absorption (µg/mm$^3$) | Solubility (µg/mm$^3$) |
| --- | --- | --- |
| One-Step ® | 164.1 (1.8) | 22.5 (0.4) |
| All-Bond 3 ® | 119.8 (1.5) | 13.0 (0.6) |
| All-Bond SE ® | 127.8 (3.9) | 25.1 (3.6) |
| H-SEA | 103.1 (1.7) | 14.1 (0.7) |

As shown in Table 5, the H-SEA composition has substantially reduced water absorption and relatively low solubility in comparison to conventional adhesives.

Although the invention has been described in detail with reference to preferred embodiments, variations and modifications exist within the scope and spirit of the invention as described and defined in the following claims.

What is claimed is:

1. A polymerizable dental adhesive composition, comprising:
    a hydrophobic, surfactant-type acidic monomer;
    a hydrophobic monomer;
    a hydrophilic monomer; and
    a solvent;
    wherein the polymerized composition has a water contact angle of about 62° or greater.

2. The dental adhesive composition of claim 1, wherein the hydrophobic, surfactant-type acidic monomer is a methacryloxyloxyalkyl dihydrogen phosphate.

3. The dental adhesive composition of claim 2, wherein the methacryloxyloxyalkyl dihydrogen phosphate has an alkyl carbon chain of 10-18 carbon atoms.

4. The dental adhesive composition of claim 1, wherein the hydrophobic, surfactant-type acidic monomer is 10-methacryloxyloxydecyl dihydrogen phosphate.

5. The dental adhesive composition of claim 1, wherein the solvent is an azeotrope.

6. The dental adhesive composition of claim 5, wherein the azeotrope is selected from the group consisting of: azeotropic mixtures of water/ethanol, water/isopropanol, water/acetonitrile and water/ethyl acetate.

7. The dental adhesive composition of claim 1, wherein the solvent is an azeotrope of ethanol and water.

8. The dental adhesive composition of claim 1, further comprising a polymerization initiator and/or a polymerization activator.

9. A polymerizable dental adhesive composition, comprising:
    between about 3-20 wt % of a hydrophobic, surfactant-type acidic monomer;
    at least about 30 wt % of a hydrophobic monomer;
    between about 5-15 wt % of a hydrophilic monomer; and
    a solvent;
    wherein the polymerized composition has a water contact angle of about 62° or greater.

10. The dental adhesive composition of claim 9, wherein the hydrophobic, surfactant-type acidic monomer is a methacryloxyloxyalkyl dihydrogen phosphate.

11. The dental adhesive composition of claim 10, wherein the methacryloxyloxyalkyl dihydrogen phosphate has an alkyl carbon chain of 10-18 carbon atoms.

12. The dental adhesive composition of claim 10, wherein the hydrophilic monomer is 2-hydroxyethyl methacrylate.

13. The dental adhesive composition of claim 10, wherein the hydrophobic monomer is bisphenol A glycidylmethacrylate.

14. The dental adhesive composition of claim 9, wherein the hydrophobic, surfactant-type acidic monomer is 10-methacryloxyloxydecyl dihydrogen phosphate.

15. The dental adhesive composition of claim 9, wherein the solvent is an azeotrope.

16. The dental adhesive composition of claim 15, wherein the azeotrope is selected from the group consisting of: azeotropic mixtures of water/ethanol, water/isopropanol, water/acetonitrile and water/ethyl acetate.

17. The dental adhesive composition of claim 9, wherein the solvent comprises between about 15-50 wt % of ethanol and between about 0.5-10 wt % of water.

18. The dental adhesive composition of claim 17, wherein the solvent comprises ethanol and water in a ratio of between about 10:1 to about 30:1 ethanol to water.

19. The dental adhesive composition of claim 18, wherein the solvent comprises ethanol and water in a ratio of about 22:1 ethanol to water.

20. The dental adhesive composition of claim 9, further comprising between about 0.1-2 wt % of a polymerization initiator and/or between about 0.2-4 wt % of a polymerization activator.

21. The dental adhesive composition of claim 9, wherein the polymerization initiator is a photoinitiator and the polymerization activator is a tertiary amine.

22. The dental adhesive composition of claim 21, wherein the photoinitiator is camphorquinone and the polymerization activator is ethyl-4-dimethylaminobenzoate.

23. A dental adhesive composition, comprising:
   a hydrophobic, surfactant-type acidic monomer;
   a hydrophobic monomer;
   a hydrophilic monomer; and
   a solvent selected from the group consisting of: azeotropic mixtures of water/ethanol, water/isopropanol, water/acetonitrile and water/ethyl acetate;
   wherein the composition is hydrophobic.

24. The dental adhesive composition of claim 1, wherein the ratio of hydrophilic to hydrophobic monomers is less than about 1:2 by wt %.

25. The dental adhesive composition of claim 24, wherein the hydrophobic, surfactant-type acidic monomer is 10-methacryloxyloxydecyl dihydrogen phosphate, the hydrophobic monomer is bisphenol A glycidylmethacrylate, the hydrophilic monomer is 2-hydroxyethyl methacrylate, and the solvent is an azeotrope of ethanol and water.

26. The dental adhesive composition of claim 1, wherein the ratio of hydrophilic to hydrophobic monomers is less than about 1:1 by wt %.

* * * * *